(12) United States Patent
Murakami et al.

(10) Patent No.: US 7,878,589 B2
(45) Date of Patent: Feb. 1, 2011

(54) OCCUPANT RESTRAINT DEVICE

(75) Inventors: Yoshiki Murakami, Tokyo (JP);
Masayoshi Kumagai, Tokyo (JP)

(73) Assignee: Takata Corporation, Tokyo (JP)

( * ) Notice: Subject to any disclaimer, the term of this patent is extended or adjusted under 35 U.S.C. 154(b) by 334 days.

(21) Appl. No.: 11/918,449

(22) PCT Filed: Oct. 24, 2006

(86) PCT No.: PCT/JP2006/321102

§ 371 (c)(1),
(2), (4) Date: Oct. 15, 2007

(87) PCT Pub. No.: WO2007/049580

PCT Pub. Date: May 3, 2007

(65) Prior Publication Data
US 2009/0026744 A1    Jan. 29, 2009

(30) Foreign Application Priority Data
Oct. 28, 2005   (JP) .............................. 2005-314861

(51) Int. Cl.
*A47C 3/00* (2006.01)
*B60N 2/42* (2006.01)
(52) U.S. Cl. ............................... 297/284.11; 297/216.1
(58) Field of Classification Search ............. 297/216.1, 297/284.11; 296/68.1; 280/728.2, 730.1
See application file for complete search history.

(56) References Cited

U.S. PATENT DOCUMENTS

| 4,629,248 A * | 12/1986 | Mawbey ................ 297/284.11 |
| 6,715,788 B2 * | 4/2004 | Saiguchi et al. .......... 280/730.1 |
| 6,935,684 B2 * | 8/2005 | Sakai ...................... 297/216.1 |
| 7,306,257 B2 * | 12/2007 | Yoshikawa et al. ....... 280/728.2 |
| 7,481,452 B2 * | 1/2009 | Itoga et al. ................ 280/733 |
| 2002/0190548 A1 * | 12/2002 | Ruel et al. ............... 297/216.1 |
| 2003/0222490 A1 * | 12/2003 | Sakai ...................... 297/216.1 |
| 2005/0046156 A1 * | 3/2005 | Yoshikawa et al. ....... 280/728.2 |
| 2005/0067209 A1 * | 3/2005 | Yoshikawa et al. .......... 180/271 |
| 2005/0104341 A1 * | 5/2005 | Sakai ...................... 280/730.1 |
| 2005/0173898 A1 * | 8/2005 | Yoshikawa et al. .......... 280/729 |
| 2005/0189749 A1 * | 9/2005 | Itaoga et al. ................ 280/733 |
| 2006/0017266 A1 * | 1/2006 | Yoshikawa et al. ....... 280/730.1 |

FOREIGN PATENT DOCUMENTS

| JP | H10-217818 | 8/1998 |
| JP | 2004-17686 | 1/2004 |
| JP | 2005-67465 | 3/2005 |
| JP | 2005-231505 | 9/2005 |
| WO | WO 2004/069586 | 8/2004 |

\* cited by examiner

*Primary Examiner*—Sarah B McPartlin
(74) *Attorney, Agent, or Firm*—Manabu Kanesaka

(57) ABSTRACT

An occupant restraint device having a high degree of freedom in attachment of an airbag is provided. A retainer 16 is applied to the inner surface of a lower portion of an airbag 12. A stub bolt 20 projecting downward from the lower surface of the retainer 16 is inserted in a bolt insertion hole 12*a* of the airbag 12, and a first nut 24 is screwed on the stud bolt 20 via a backing plate 22 from outside the airbag 12. Thereby, the airbag 12 is connected to the retainer 16. A gas generator 14 is connected to the retainer 16 by a bracket 30. The stud bolt 20 is disposed on the rear side from a center line of the airbag 12.

15 Claims, 14 Drawing Sheets

US 7,878,589 B2

OCCUPANT RESTRAINT DEVICE

TECHNICAL FIELD

The present invention relates to an occupant restraint device for restraining an occupant in a seat of a vehicle, such as an automobile, in the event of a collision, and more particularly to an occupant restraint device configured to restrain the lumbar region of the occupant in the collision to prevent the body of the occupant from moving forward and downward.

BACKGROUND ART

Japanese Unexamined Patent Application Publication No. 10-217818 describes, as a system for restraining an occupant of an automobile in the event of a collision, an occupant restraint device that increases the height or the hardness of a front portion of a sheet cushion in the event of a vehicle collision to prevent the submarine phenomenon in which the occupant slips out from under a lap belt in the collision even when the occupant wears a seat belt.

FIG. 13 is a vertical cross-sectional view in the anteroposterior direction of a seat, illustrating the occupant restraint device according to the above publication. In a front portion of the seat, an airbag 44 is disposed between a seat pan 40 and a seat pad 42. The airbag 44 extends in the lateral width direction of the seat, and is inflatable by an inflator 46. The upper surface of the seat pad 42 is covered by a trim cover 48, on which the occupant sits.

When the inflator 46 is activated in the vehicle collision, the airbag 44 inflates. Thereby, a front portion of the seat pad 42 is pushed up, or is thrust up from beneath to have an increased density. Accordingly, forward movement of the body of the occupant is prevented (suppressed).

A stud bolt 50 projects downward from the inflator 46 inside the airbag 44. The bolt 50 pierces through the airbag 44 and the seat pan 40 to project downward from the seat pan 40. With a nut 52 screwed on the bolt 50, the inflator 46 is fixed to the seat pan 40, and the airbag 44 is sandwiched and fixed between the inflator 46 and the seat pan 40.

Patent Document Japanese Unexamined Patent Application Publication No. 10-217818

In the occupant restraint device according to the above Japanese Unexamined Patent Application Publication No. 10-217818, the stud bolt 50 of the inflator is located at the center in the anteroposterior direction of the airbag 44 (on the center line passing through the center in the anteroposterior direction of the airbag 44 and extending in the lateral direction).

Recently, the seat has become multifunctional. Thus, with a variety of structures laid out under the seat, the space for accommodating the airbag has been reduced.

DISCLOSURE OF INVENTION

An object of the present invention is to provide an occupant restraint device enabling attachment of an airbag with no difficulty in spite of a layout restriction.

An occupant restraint device according to a first aspect includes an airbag inflatable so as to push a seat cushion from beneath, and a gas generator for inflating the airbag. The occupant restraint device, in which the airbag is connected to a seat pan or an airbag container provided to the seat pan, is characterized in that a connecting portion of the airbag connected to the seat pan or the container is disposed at a position displaced from the center lines in the anteroposterior direction and the lateral direction of the airbag.

The connecting portion may be disposed on each of the opposite end sides in the lateral direction of the airbag, and the connecting portion may be located on the front portion side or the rear portion side of the airbag.

The connecting portion may be disposed to a marginal portion of at least one of the front edge side and the rear edge side of the airbag, and the connecting portion of the marginal portion may be disposed on the left side or the right side of the airbag.

A bolt may project from the gas generator or a gas generator attachment retainer and pierce through the airbag and the seat pan or the container. With a nut screwed on the bolt, the airbag and the gas generator may be connected to the seat pan or the container. The bolt may be disposed at a position displaced from the center lines in the anteroposterior direction and the lateral direction.

A cover member may be provided to at least partially cover the outer circumference of the airbag. The cover member may be connected to the seat pan or the container. A connecting portion of the cover member connected to the seat pan or the container may be disposed at a position displaced from the center lines in the anteroposterior direction and the lateral direction of the airbag.

An occupant restraint device according to a second aspect includes an airbag inflatable so as to push a seat cushion from beneath, a cover member for at least partially covering the outer circumference of the airbag, and a gas generator for inflating the airbag. The occupant restraint device, in which the cover member is connected to a seat pan or an airbag container provided to the seat pan, is characterized in that a connecting portion of the cover member connected to the seat pan or the container is disposed at a position displaced from the center lines in the anteroposterior direction and the lateral direction of the airbag.

DETAILED DESCRIPTION

In an occupant restraint device according to the prevent invention, a connecting portion of an airbag or a cover member for covering the airbag, which is connected to a seat pan or a container, is displaced from the center lines of the airbag. Thus, the connecting portion can be disposed without being affected by a layout restriction of a seat.

In the present invention, when the airbag is provided with the cover member, each of the airbag and the cover member may be connected to the seat pan or the container, or it may be configured such that only the cover member is connected to the seat pan or the container to cause the cover member to retain the airbag.

When the connecting portion is disposed on each of the opposite ends of the left end and the right end of the airbag, it is preferable to dispose the connecting portion on the front portion side or the rear portion side of the airbag.

When the connecting portion is disposed to a marginal portion on the front or rear side of the airbag, it is preferable to dispose the connecting portion on the left side or the right side of the airbag.

Further, to fix the airbag and a gas generator by using a bolt projecting from the gas generator or a retainer thereof, the bolt is disposed to be displaced from the center lines of the airbag.

In any of the cases, the connecting portion, such as the bolt, is prevented from interfering with a structure of the seat. Accordingly, the degree of layout freedom is increased.

If the connecting portion is disposed to the marginal portion on the front or rear side of the airbag (i.e., a place other than the opposite ends of the airbag), the airbag (a portion thereof which inflates to have an increased thickness) can be widely extended from the vicinity of one end in the lateral direction of the seat to the vicinity of the other end.

In the present invention, the center line of the airbag refers to the center line defined in a state in which the airbag is set in the seat pan or the container. Therefore, for example, if the airbag is folded and set in the seat pan or the container, the center line of the airbag refers to the center line of the airbag in the folded state, i.e., the center line of the folded form of the airbag. Needless to say, if the airbag is set in the seat pan or the container in a not folded and flatly spread state, the center line of the airbag in the flatly spread state is the center line in the set state.

Figure 1:
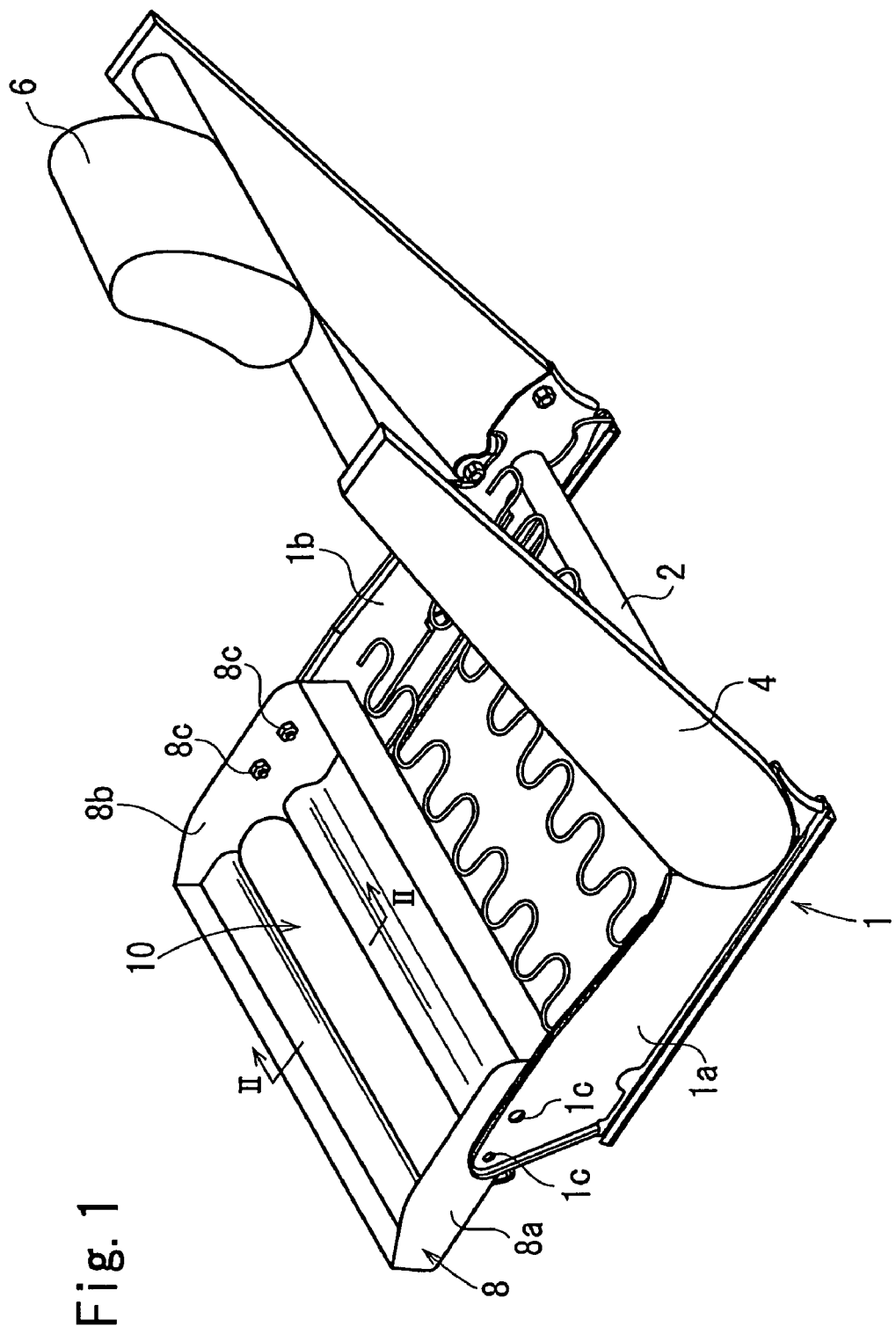
FIG. 1 is a perspective view of a frame of a seat provided with an occupant restraint device according to an embodiment.
Figure 2:
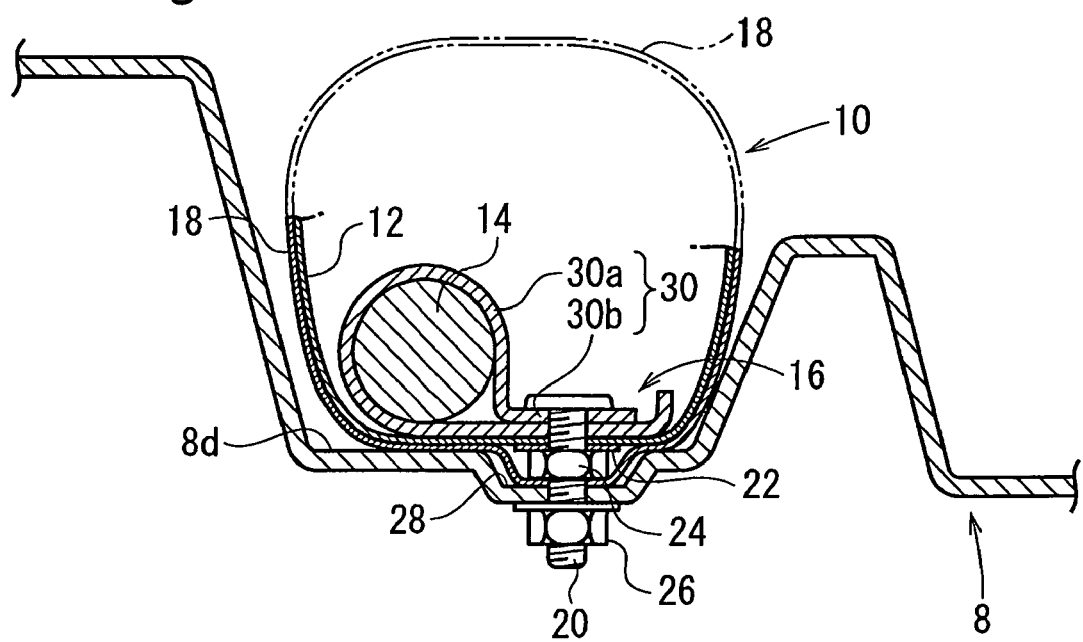
FIG. 2 is a cross-sectional view along the II-II line of FIG. 1.
Figure 3:
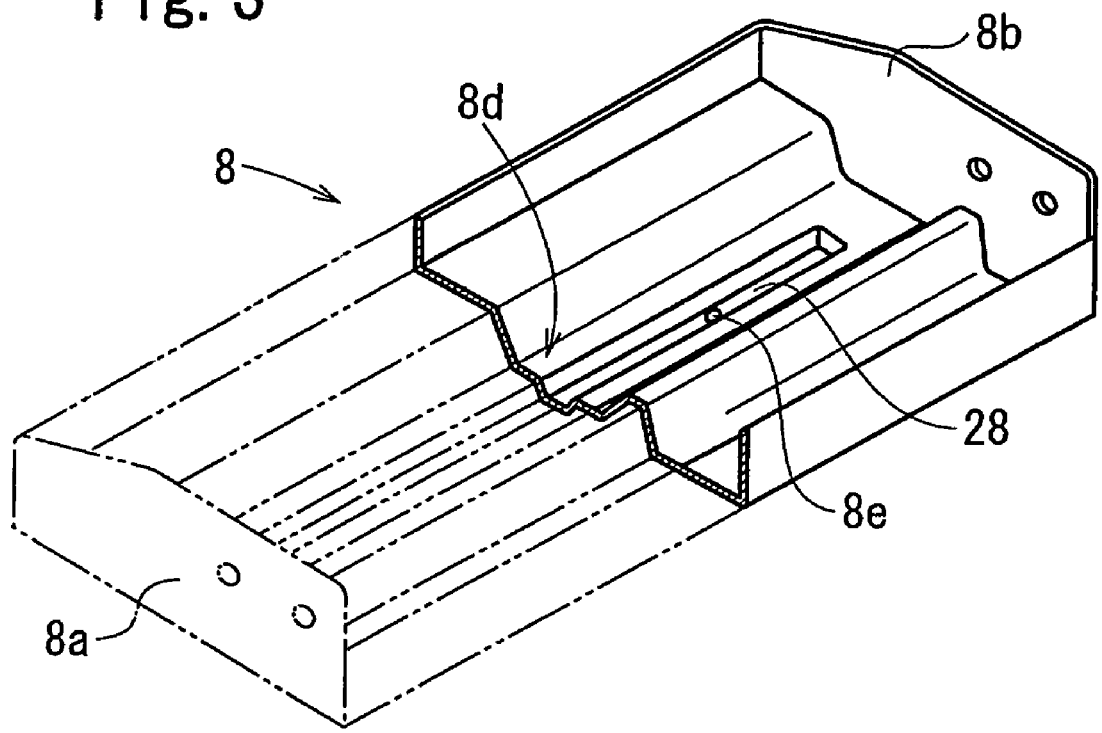
FIG. 3 is a cross-sectional perspective view of a seat pan of the occupant restraint device of FIG. 1.
Figure 4:
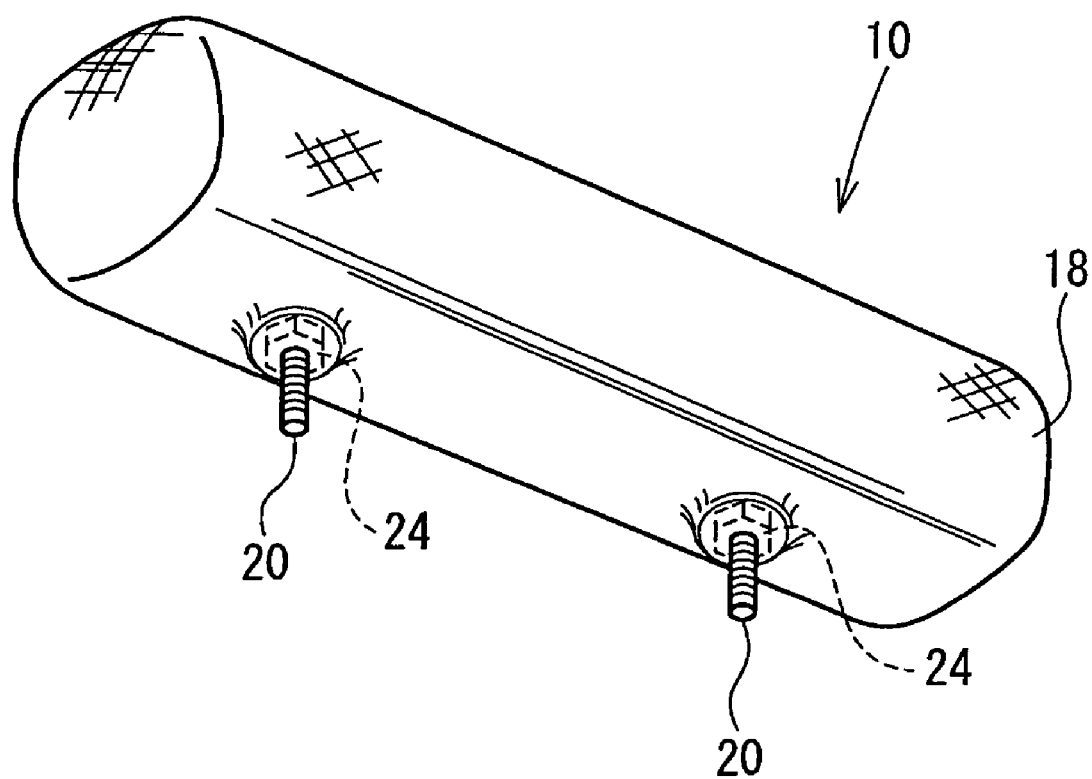
FIG. 4 is a perspective view of an airbag module of the occupant restraint device of FIG. 1.
Figure 5:
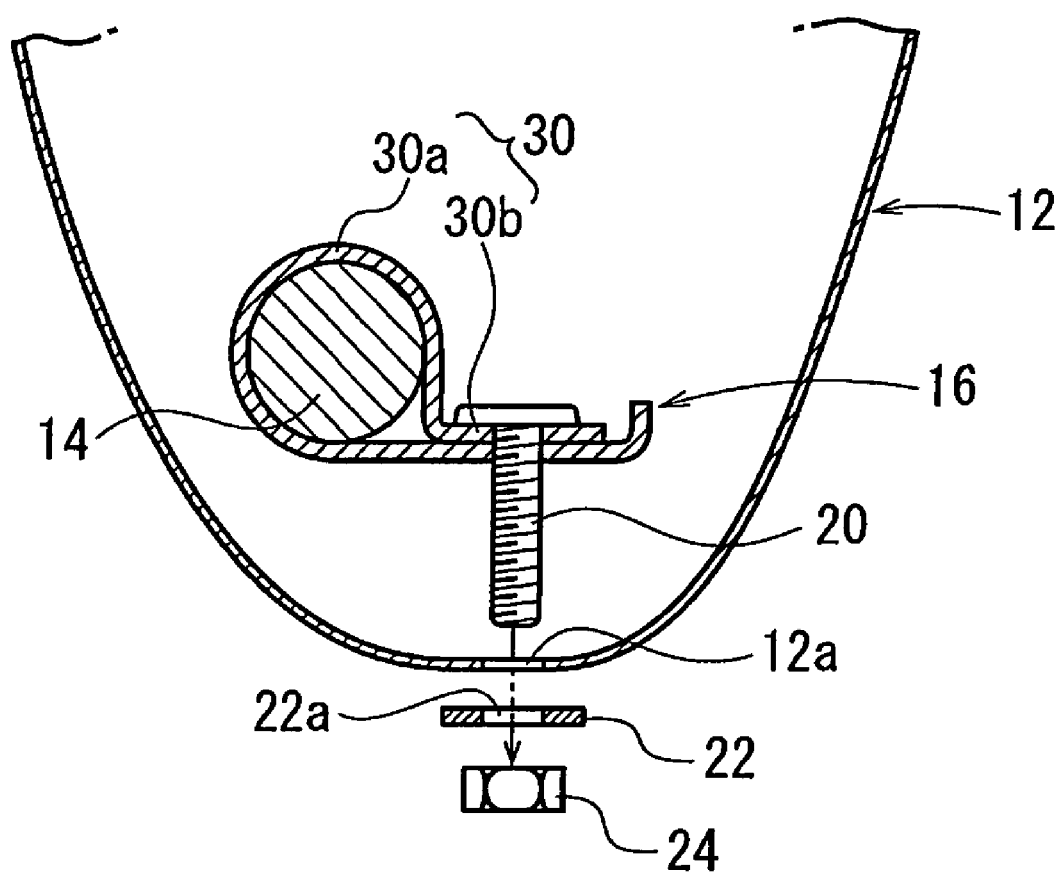
FIG. 5 is an exploded cross-sectional view of the airbag module of the occupant restraint device of FIG. 1.
Figure 6:
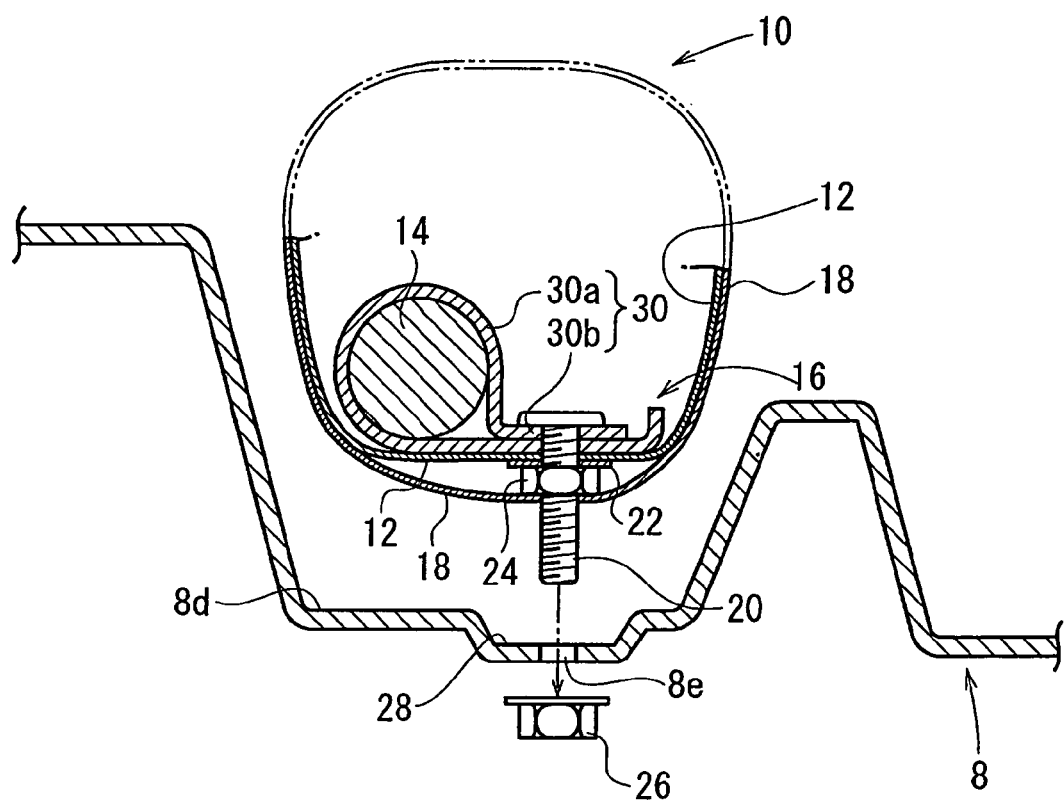
FIG. 6 is an exploded cross-sectional view of the airbag module and the seat pan of the occupant restraint device of FIG. 1.

With reference to the drawings, an embodiment of the present invention will be described below. FIG. 1 is a perspective view of a frame of a seat provided with an occupant restraint device according to an embodiment of the present invention. FIG. 2 is a cross-sectional view along the II-II line of FIG. 1. FIG. 3 is a cross-sectional perspective view of a seat pan. FIG. 4 is a perspective view of an airbag module of the occupant restraint device, as viewed from beneath. FIG. 5 is an exploded view of the airbag module. FIG. 6 is an exploded view of the airbag module and the seat pan.

The frame forming the seat of an automobile is formed by a base frame 1, and a back frame 4 rotatably connected to the base frame 1 via a spindle 2 and a reclining device (illustration omitted). An upper portion of the back frame 4 is attached with a headrest 6.

The base frame 1 includes side frames 1a and 1b on the left and right sides. A seat pan 8 is provided between front portions of the side frames 1a and 1b. On the opposite end portions in the lateral width direction of the seat pan 8, side wall portions 8a and 8b are provided upright which overlap the inner surfaces of the side frames 1a and 1b (mutually facing side surfaces of the side frames 1a and 1b), respectively. The side frames 1a and 1b and the side wall portions 8a and 8b are provided with bolt insertion holes (illustration omitted) which pierce through the overlapped side frames and side wall portions. When bolts 1c are respectively inserted in the holes and nuts 8c are screwed on the bolts 1c, the seat pan 8 is fixed between the side frames 1a and 1b.

Although not illustrated, a seat cushion and a seat back formed of urethane or the like are attached to the base frame 1 and the back frame 4. The seat pan 8 is disposed under a front portion of the seat cushion.

The seat pan 8 is attached with an airbag module 10 of the occupant restraint device.

The airbag module 10 is disposed in a folded state between seat pan 8 and the seat cushion, and includes an airbag 12 which, upon introduction of gas therein, inflates to push the seat cushion from beneath, a gas generator 14 for inflating the airbag 12, a retainer 16 connected to the airbag 12 and the gas generator 14 and fixed to the seat pan 8 by later-described stud bolts 20, and a cover member 18 which surrounds the folded form of the airbag 12 to restrain the airbag 12 in the folded state. The airbag 12 is disposed to extend in the lateral width direction of the seat pan 8 (the width direction of a vehicle body).

In the present embodiment, the upper surface of the seat pan 8 is provided with an airbag module storage portion 8d (FIG. 3), which is formed by a concave step portion recessed by the height (the dimension in the vertical direction) of the airbag module 10. The airbag module 10 is set in the storage portion 8d.

In the present embodiment, the retainer 16 is plate-like and extends along the bottom surface of the airbag module storage portion 8d. The retainer 16 is disposed inside the airbag 12, and is applied to the inner surface of a lower portion of the airbag 12 to press the lower portion of the airbag 12 from inside the airbag 12 onto the bottom surface of the airbag module storage portion 8d.

The lower surface of the retainer 16 is provided with the stud bolts 20 projecting downward therefrom. The stud bolts 20 are inserted in bolt insertion holes 12a (FIG. 5) drilled in the lower portion of the airbag 12, and project outside the airbag 12. In the present embodiment, two stud bolts 20 and 20 are provided at different positions on the left end side and the right end side, respectively, from the center in the lateral direction of the airbag 12. With a first nut 24 screwed on each of the stud bolts 20 via a backing plate 22 from outside the airbag 12, the airbag 12 is connected to the retainer 16. The reference numeral 22a of FIG. 5 denotes a bolt insertion hole of the backing plate 22, in which the stud bolt 20 is inserted.

In the present embodiment, the respective stud bolts 20 are disposed at positions apart by the same distance to the left side and the right side, respectively, from the center in the lateral direction of the airbag 12 (the center line (illustration omitted) passing through the center in the lateral direction of the airbag 12 and extending in the anteroposterior direction). The distance of one of the stud bolts 20 from the center line, however, may be different from the distance of the other one of the stud bolts 20 from the center line.

The cover member 18 is spread over the lower side of the airbag 12 to cover the nuts 24. The stud bolts 20 pierce through the cover member 18 to project further downward.

Each of the stud bolts 20 is further inserted in a bolt insertion hole 8e (FIG. 6) drilled in the bottom surface of the airbag module storage portion 8*d*. With a second nut 26 screwed on the stud bolt 20 from under the seat pan 8, the retainer 16 is fixed to the bottom surface of the airbag module storage portion 8*d*.

As illustrated in FIG. 6, the bottom surface of the airbag module storage portion 8*d* is provided with a concave portion 28 having a depth capable of completely storing the backing plates 22, the first nuts 24, and so forth applied to the outer surface of the lower portion of the airbag 12, when the retainer 16 is disposed along the bottom surface. The width of the concave portion 28 is set to be narrower than the width of the retainer 16. The bolt insertion hole 8*e* is disposed in the concave portion 28.

Therefore, when each of the stud bolts 20 is inserted in the bolt insertion hole 8*e* and the nut 26 is screwed on the stud bolt 20 from under the seat pan 8, the backing plate 22, the nut 24, and so forth are stored in the concave portion 28, and the retainer 16 is made in close contact with the bottom surface of the airbag module storage portion 8*d* via a base cloth of the airbag 12, as illustrated in FIG. 2.

The gas generator 14 is attached to the upper surface side of the retainer 16 by a bracket 30. The gas generator 14 has a substantially cylindrical shape in the present embodiment, and is disposed inside the airbag 12 such that the direction of the axial center line of the gas generator 14 corresponds to the lateral width direction of the seat pan 8. The bracket 30 includes a C-shaped band portion 30*a* which projects from the front edge of the retainer 16 (an edge portion on the front side of the vehicle) and is bent to be warped into a substantially C-shape on the upper surface side of the retainer 16, and a flange portion 30*b* extending from the leading end side of the C-shaped band portion 30*a* to overlap the upper surface of the retainer 16. The stud bolts 20 project downward from the lower surface of the flange portion 30*b*, and pierce through the retainer 16 to project downward from the retainer 16.

When the gas generator 14 is inserted into the C-shaped band portion 30*a* and the nuts 24 are screwed on the stud bolts 20 to sandwich and press the flange portion 30*b* and the retainer 16, the gas generator 14 is fixed to the retainer 16.

In the present embodiment, the cover member 18 is bag-like and formed by a cloth wrapping the entirety of the folded form of the airbag 12, as illustrated in FIG. 4. The circumferential length of the cover member 18 is set to be shorter than the circumferential length of the airbag 12 in the inflated state. It is therefore configured such that the maximum circumferential length of the airbag 12 in the inflated state remains within the circumferential length of the cover member 18 to increase the inner pressure of the airbag 12.

In the thus configured occupant restraint device, prior to the attachment of the airbag module 10 to the seat pan 8, the airbag module 10 is assembled into the state illustrated in FIG. 4, in which the airbag 12 and the gas generator 14 are respectively connected to the retainer 16, the airbag 12 is folded, and the cover member 18 is attached to the folded form of the airbag 12.

That is, firstly, the gas generator 14 is previously inserted into the C-shaped band portion 30*a* of the bracket 30, and the retainer 16 is disposed inside the airbag 12. Then, as illustrated in FIG. 5, each of the stud bolts 20 is inserted in the bolt insertion hole 12*a* formed in the lower portion of the airbag 12. Then, from outside the airbag 12, the first nut 24 is screwed on the stud bolt 20 via the backing plate 22 to connect the airbag 12 to the retainer 16. In this process, the flange portion 30*b* of the bracket 30 and the retainer 16 are sandwiched and pressed due to the screwing of the nut 24. Thereby, the gas generator 14 is fixed to the retainer 16.

Thereafter, the airbag 12 is folded, and the folded form of the airbag 12 is covered by the cover member 18.

Thereafter, the thus assembled airbag module 10 is disposed in the storage portion 8*d* of the seat pan 8. In this process, each of the stud bolts 20 is inserted in the bolt insertion hole 8*e*, and the second nut 26 is screwed on the stud bolt 20 from the lower surface side of the seat pan 8. Thereby, the airbag module 10 is fixed to the seat pan 8.

In the present embodiment, the respective stud bolts 20 are disposed on the rear side from the center line (illustration omitted) passing through the center in the anteroposterior direction of the airbag 12 and extending in the lateral direction. Thus, even if there is a structure directly under the center line of the airbag 12, the airbag 12 and the gas generator 14 can be attached with no difficulty.

In the present embodiment, the respective stud bolts 20 are disposed at the positions apart by the same distance toward the left side and the right side from the center line (illustration omitted) passing through the center in the lateral direction of the airbag 12 and extending in the anteroposterior direction. If there is a structure directly under the airbag 12, the respective stud bolts 12 may be accordingly displaced in the lateral direction to avoid the structure.

In the present occupant restraint device, prior to the attachment of the airbag module 10 to the seat pan 8, the airbag 12 and the gas generator 14 have been connected to the retainer 16, and the airbag 12 has been folded. Therefore, the operation of attaching the airbag module 10 to the seat pan 8 can be extremely easily performed.

In the present embodiment, the backing plates 22, the first nuts 24, and so forth, which connect the airbag 12 to the retainer 16, project downward from the lower surface of the retainer 16. The bottom surface of the airbag module storage portion 8*d* is formed with the concave portion 28 for storing the above components. Thus, when the retainer 16 is disposed in the airbag module storage portion 8*d*, the backing plates 22, the nuts 24, and so forth are stored in the concave portion 28, and the retainer 16 is made in close contact with the bottom surface of the storage portion 8*d* via the airbag 12. Thereby, the lower portion of the airbag 12 is firmly held between the retainer 16 and a bottom portion of the airbag module storage portion 8*d*. Accordingly, the posture of the airbag 12 in the inflated state is highly stabilized.

Figure 7:
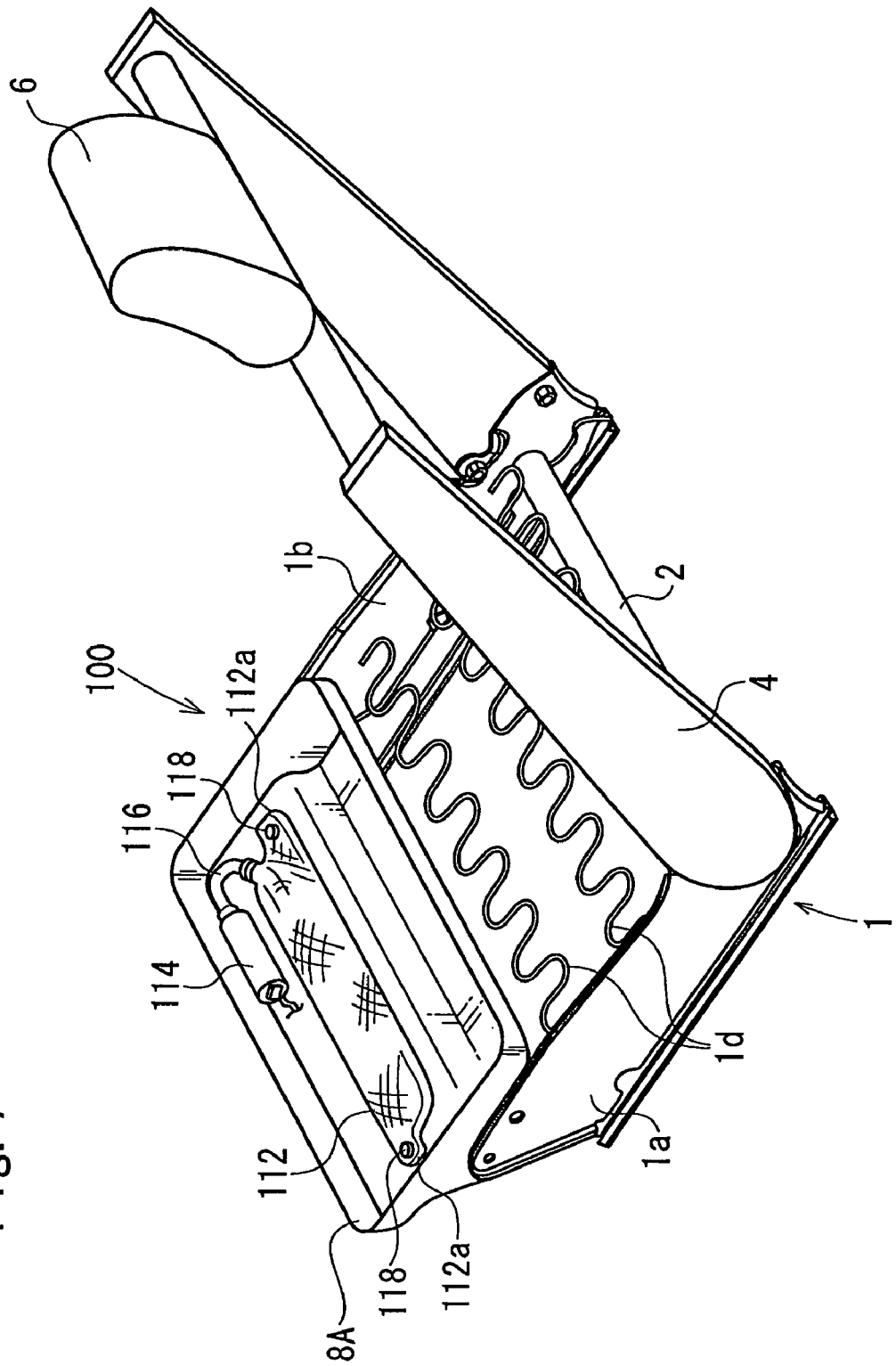
FIG. 7 is a perspective view of a frame of a seat provided with an occupant restraint device according to another embodiment.
Figure 8:
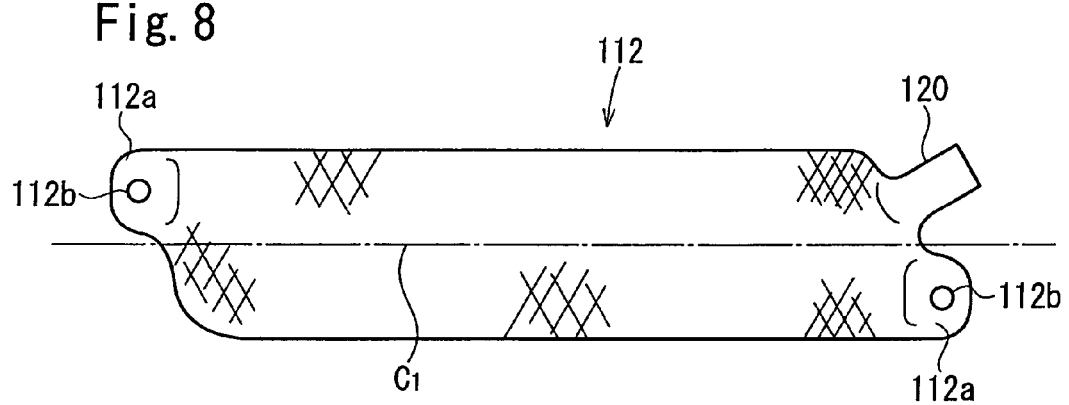
FIG. 8 is a plan view of an airbag of the occupant restraint device of FIG. 7.
Figure 9:
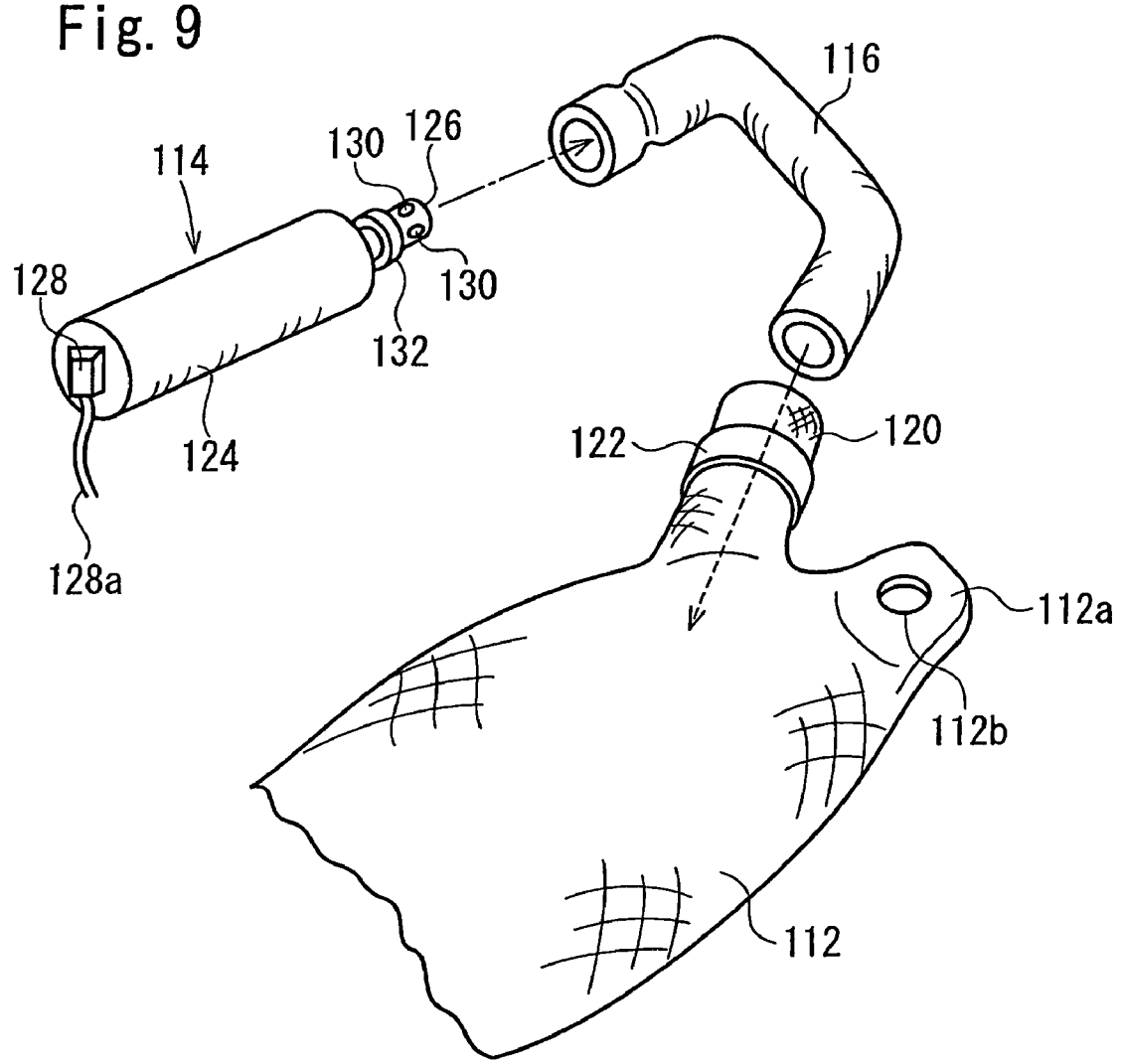
FIG. 9 is an exploded perspective view of the airbag, a duct, and a gas generator of the occupant restraint device of FIG. 7.

FIG. 7 is a perspective view of a frame of a seat provided with an occupant restraint device according to another embodiment. FIG. 8 is a plan view of an airbag of the occupant restraint device. FIG. 9 is an exploded perspective view of a gas generator, a duct, and the airbag of the occupant restraint device.

The occupant restraint device 100 according to the present embodiment also includes an inflatable airbag 112 disposed on a seat pan 8A (under a front portion of a seat cushion (illustration omitted)) and extending in the lateral direction, and a gas generator 114 for inflating the airbag 112. In the present embodiment, the gas generator 114 is disposed outside the airbag 112, and the airbag 112 and the gas generator 114 are connected to each other via a duct 116.

In the present embodiment, the opposite ends in the lateral direction of the airbag 112 are respectively provided with connecting portions 112*a* of the airbag 112 connected to the seat pan 8A. The connecting portions 112*a* and 112*a* are respectively fastened to the seat pan 8A by bolts 118. In the present embodiment, the respective connecting portions 112*a* are ear-shaped and project from the left end side and the right end side of the airbag 112, respectively, in the extending direction of the airbag 112. The reference numeral 112*b* of FIG. 8 denotes an insertion hole provided in each of the connecting portions 112a, in which the bolt 118 is inserted.

As illustrated in FIG. 8, each of the connecting portions 112a is disposed at a position displaced forward or backward from a center line $C_1$, which passes through the center in the anteroposterior direction of the airbag 112 and extends in the lateral direction. Specifically, in the present embodiment, the connecting portion 112a on the left end side of the airbag 112 in FIG. 8 is disposed in a front end portion of the left end side of the airbag 112, while the connecting portion 112a on the right end side of the airbag 112 is disposed in a rear end portion of the right end side of the airbag 112.

In the present embodiment, a hose-like portion 120 extends from a front end portion of the right end side of the airbag 112 to connect the duct 116 to the airbag 112. The basal end side of the hose-like portion 120 communicates with the interior of the airbag 112. As illustrated in FIG. 9, one end of the duct 116 is inserted into the hose-like portion 120, and the hose-like portion 120 is fixedly bound to the duct 116 by a band 122. Thereby, the hose-like portion 120 and the duct 116 are connected to each other.

As illustrated in FIG. 9, in the present embodiment, the gas generator 114 includes a substantially cylindrical body portion 124, and a tubular nozzle portion (a gas ejection portion) 126 projecting from one end (the leading end) side of the body portion 124. The reference numeral 128 denotes an initiator (a gas generant igniter) provided on the other end (the rear end) side of the body portion 124, while the reference numeral 128a denotes a conducting harness leading to the initiator 128.

The lateral circumferential surface of the leading end side of the nozzle portion 126 is provided with a plurality of gas ejection openings 130 at intervals in the circumferential direction. Further, the basal end side of the nozzle portion 126 is provided with a flange portion 132 around the circumference thereof for connecting the duct thereto.

The other end of the duct 116 is fit to the outside of the nozzle portion 126, and is subjected to caulking or drawing deformation to engage with the flange portion 132. Thereby, the duct 116 and the nozzle portion 126 are connected to each other.

As illustrated in FIG. 7, the gas generator 114 is disposed in the vicinity of the front end of the seat pan 8A, when the direction of the axis line of the gas generator 114 corresponds to the lateral width direction of the seat pan 8A.

In the present occupant restraint device 100, each of the connecting portions 112a is disposed at the position displaced toward the front side or the rear side from the center line $C_1$, which passes through the center in the anteroposterior direction of the airbag 112 and extends in the lateral direction. Thus, the airbag 112 can be attached with no difficulty, even if there is a structure directly under the center line $C_1$ of the airbag 112.

The operation of the present occupant restraint device 100 is as follows.

If a vehicle including the present occupant restraint device 100 falls in an emergency situation, such as a collision, the gas generator 114 is activated to eject gas. The gas generated from the gas generator 114 is introduced into the airbag 112 through the duct 116, and the airbag 112 inflates. Then, due to the inflated airbag 112, the seat cushion is pushed up, or is thrust up to have an increased density (i.e., increased hardness). As a result, the lumbar region of an occupant seated in the seat is prevented from moving forward.

Figure 10:
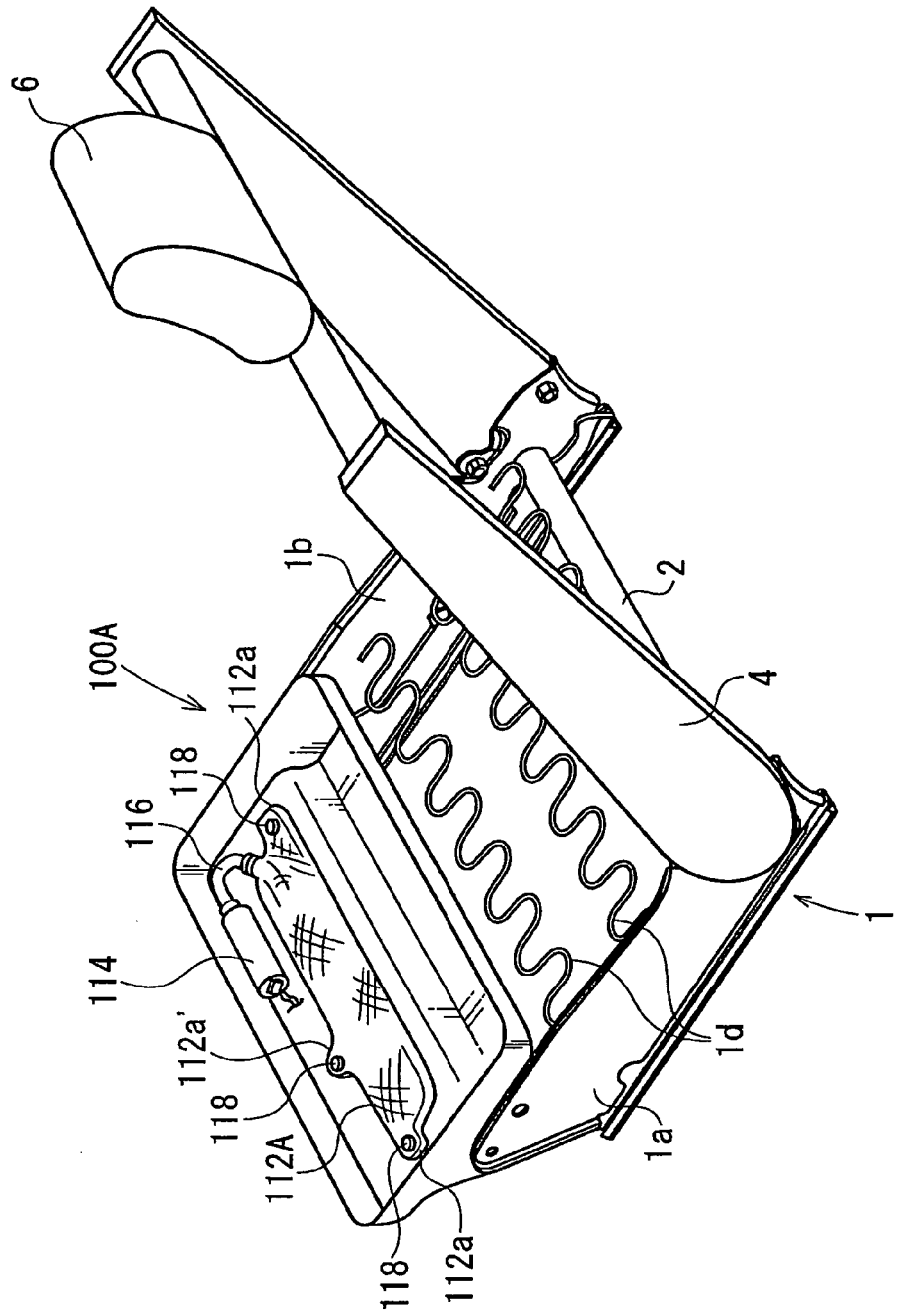
FIG. 10 is a perspective view of a frame of a seat provided with an occupant restraint device according to an embodiment.
Figure 11:
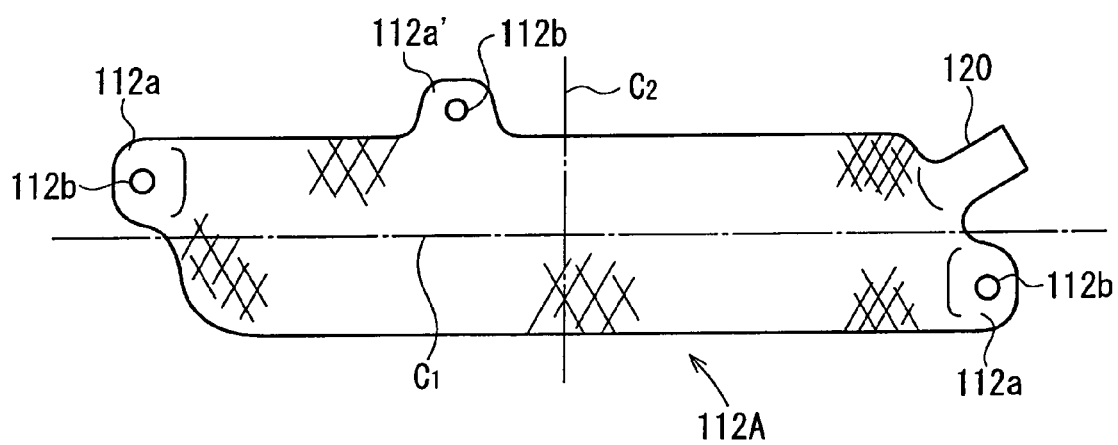
FIG. 11 is a plan view of an airbag of the occupant restraint device of FIG. 10.

In the above embodiment of FIGS. 7 to 9, the connecting portion 112a connected to the seat pan 8A is provided only to the opposite end portions of the airbag 112. The connecting portion, however, may be provided at a place other than the opposite end portions. FIG. 10 is a perspective view of an occupant restraint device 100A including an airbag 112A of such a configuration. FIG. 11 is a plan view of the airbag 112A.

The airbag 112A of the embodiment of FIGS. 10 and 11 is configured such that further a connecting portion 112a' connected to the seat pan 8A is provided to a marginal edge on the front side (hereinafter referred to as the front edge) of the airbag 112 in the foregoing embodiment of FIGS. 7 to 9. The connecting portion 112a' is also provided with the bolt insertion hole 112b. As illustrated in FIG. 11, the connecting portion 112a' is disposed at a position displaced by a predetermined distance from a center line $C_2$, which passes through the center in the lateral direction of the airbag 112A and extends in the anteroposterior direction, toward one end (toward the left end in the present embodiment) of the front edge.

In the present embodiment, the airbag 112A is fastened to the seat pan 8A by the bolts 118 at three places, i.e., the connecting portions 112a and 112a on the opposite ends of the airbag 112A and the connecting portion 112a' on the front edge.

The airbag 112A and the occupant restraint device 100A including the airbag 112A are similar in the other configurations to the foregoing airbag 112 and occupant restraint device 100 of FIGS. 7 to 9. The reference numerals of FIGS. 10 and 11 the same as the reference numerals of FIGS. 7 to 9 denote the same components.

In the present airbag 112A, too, each of the connecting portions 112a and 112a on the opposite ends of the airbag 112A is disposed at a position displaced toward the front side or the rear side from the center line $C_1$, which passes through the center in the anteroposterior direction of the airbag 112A and extends in the lateral direction. Thus, the connecting portions 112a and 112a can be fastened to the seat pan 8A with no difficulty, even if there is a structure directly under the center line $C_1$. Further, the connecting portion 112a' of the front edge of the airbag 112A is disposed at the position displaced from the center line $C_2$, which passes through the center in the lateral direction of the airbag 112A and extends in the anteroposterior direction, toward one end (the left end) of the front edge. Thus, the connecting portion 112a' can be fastened to the seat pan 8A with no difficulty, even if there is a structure directly under the center line $C_2$.

In the present invention, a connecting portion connected to the seat pan 8A may be further provided to a marginal edge on the rear side (hereinafter referred to as the rear edge) of the airbag.

Figure 12:
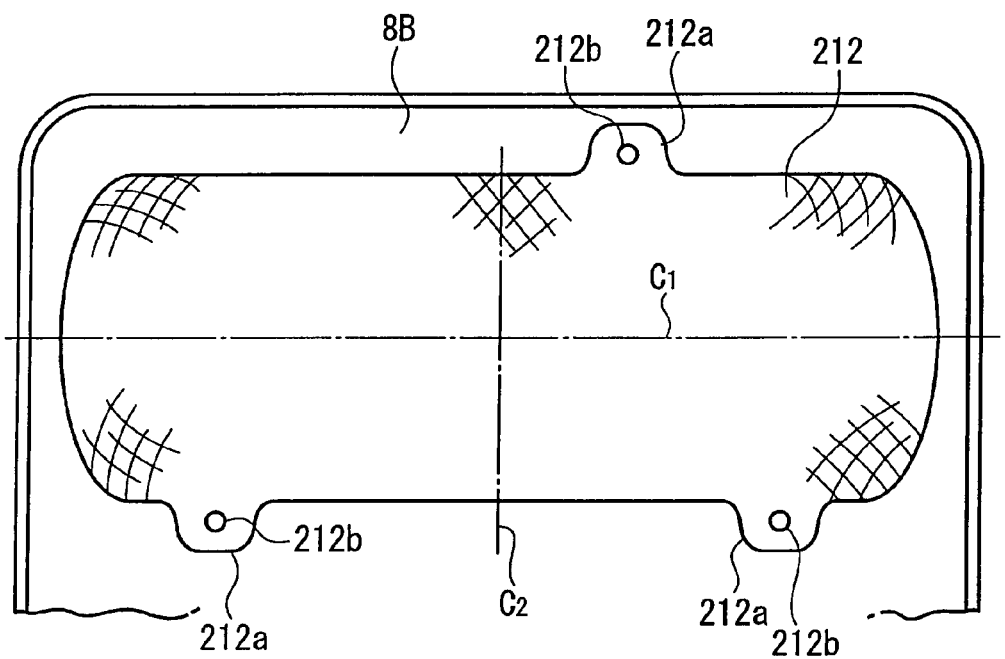
FIG. 12 is a plan view of an airbag of an occupant restraint device according to still another embodiment.
Figure 13:
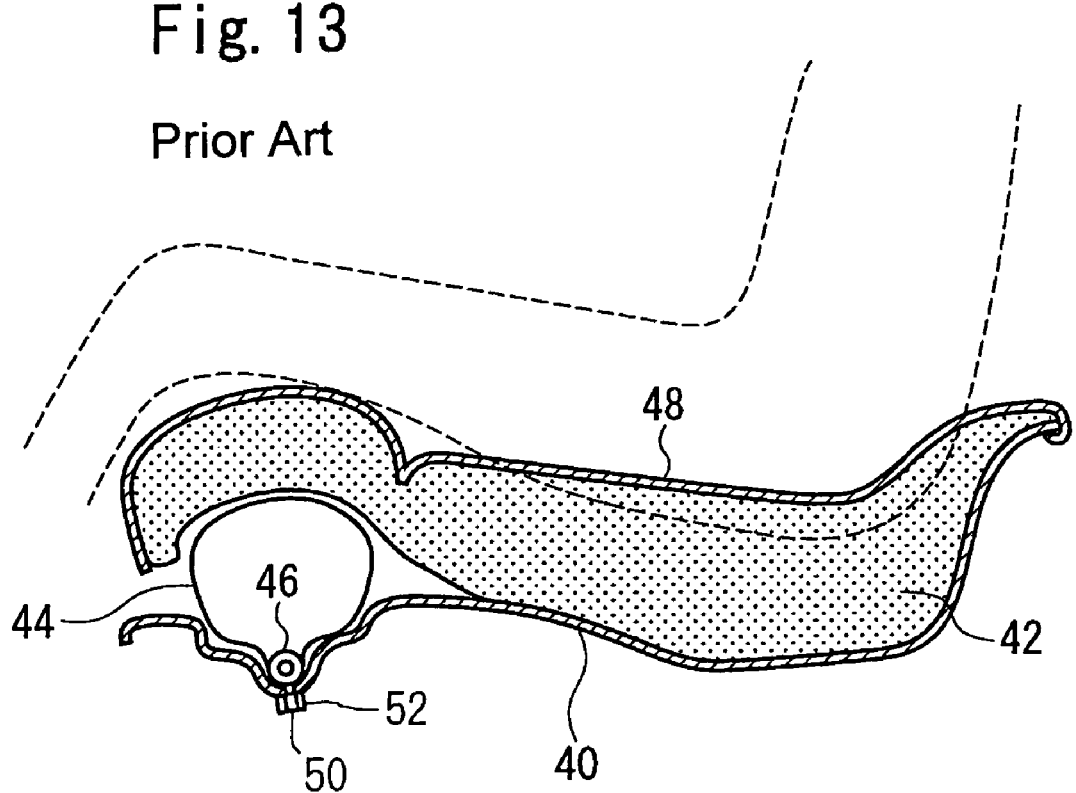
FIG. 13 is a vertical cross-sectional view of an occupant restraint device according to a conventional example.

FIG. 12 is a plan view of an airbag of an occupant restraint device according to still another embodiment.

The airbag 212 of the present embodiment is also disposed on a seat pan 8B (under a front portion of a seat cushion), and extends in the lateral direction. In the present embodiment, the airbag 212 is configured to include therein a hollow chamber which is inflatable to have an increased thickness over substantially the entire length from one end to the other end in the lateral direction of the airbag 212.

The front edge and the rear edge of the airbag 212 are respectively provided with connecting portions 212a connected to the seat pan 8B. The connecting portions 212a are fastened to the seat pan 8B by bolts (illustration omitted). In the present embodiment, each of the connecting portions 212a is ear-shaped and projects forward from the front edge or projects backward from the rear edge of the airbag 212. The reference numeral 212b denotes an insertion hole provided in each of the connecting portions 212a, in which the bolt is inserted.

In the present embodiment, the front edge of the airbag 212 is provided with one connecting portion 212a, while the rear edge is provided with two connecting portions 212a and 212a. Specifically, the connecting portion 212a of the front edge is disposed at a position displaced by a predetermined distance from the center line $C_2$, which passes through the center in the lateral direction of the airbag 212 and extends in the anteroposterior direction, toward one end (toward the right end in the present embodiment) of the front edge. Further, one of the connecting portions 212a of the rear edge is disposed at a position displaced by a predetermined distance from the center line $C_2$ toward one end of the rear edge, while the other one of the connecting portions 212a is disposed at a position displaced by a predetermined distance from the center line $C_2$ toward the other end of the rear edge.

The airbag 212 is placed on the seat pan 8B, without being folded into a reduced width in the anteroposterior direction, i.e., in the flatly spread state, and the respective connecting portions 212a are fastened to the seat pan 8B by the bolts.

Although not illustrated, a gas generator is disposed inside the airbag 212 in the present embodiment, similarly as in the foregoing embodiment of FIGS. 1 to 6. The gas generator is similar in installation structure to the gas generator of the embodiment of FIGS. 1 to 6. The gas generator, however, may be disposed outside the airbag 212 and connected to the airbag 212 via a duct or the like, as in the embodiment of FIGS. 10 and 11.

In the occupant restraint device including the airbag 212 of the above configuration, too, the respective connecting portions 212a and 212a are provided to the front edge and the rear edge of the airbag 212, and are disposed at the positions displaced toward the left side and the right side from the center line $C_2$, which passes through the center in the lateral direction of the airbag 212 and extends in the anteroposterior direction. Thus, the connecting portions 212a can be fastened to the seat pan 8B with no difficulty, even if there is a structure directly under the center line $C_2$ and the center line $C_1$, which passes through the center in the anteroposterior direction of the airbag 212 and extends in the lateral direction.

In the present embodiment, the opposite ends in the lateral direction of the airbag 212 are not provided with a connecting portion connected to the seat pan 8B. Thus, the airbag 212 (the hollow chamber thereof inflatable to increase the thickness of the interior of the airbag 212) can be widely extended from the vicinity of one end in the lateral direction of the seat pan 8B to the vicinity of the other end.

If an airbag is placed on a seat pan without being folded, as in the present embodiment, the airbag starts to inflate directly upward without making an unfolding movement in the inflation thereof. Therefore, the inflation of the airbag is highly smoothly performed.

Figure 14A:
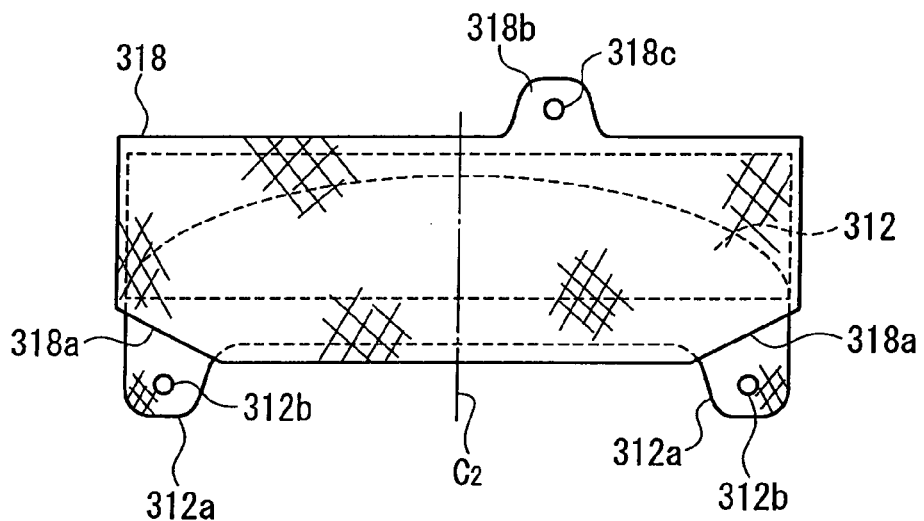
FIGS. 14a, 14b, and 14c are diagrams illustrating a configuration of an airbag according to still another embodiment.
Figure 14B:
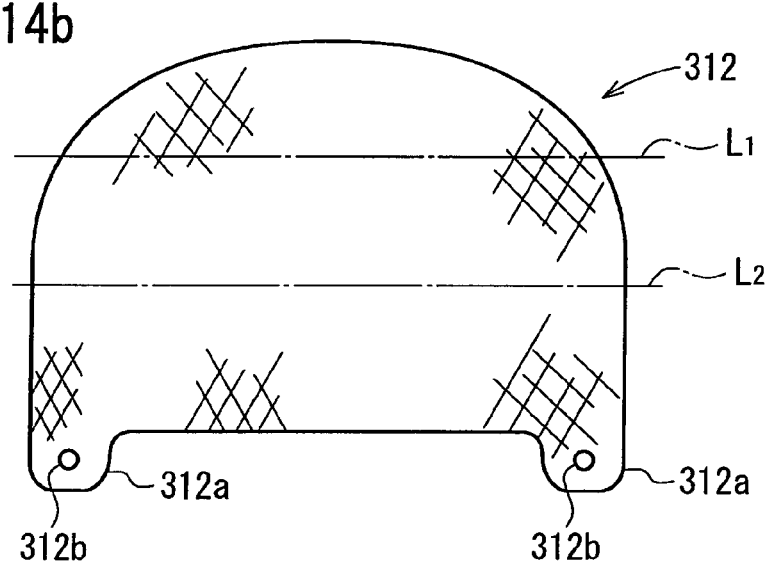
Figure 14C:
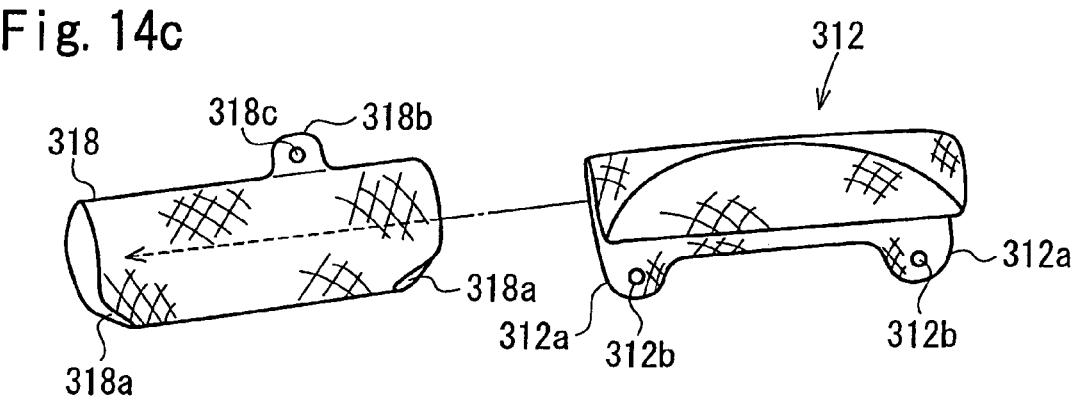

In the present invention, a cover member for covering the airbag may be provided and connected to the seat pan, a retainer, or the like, to fix the airbag. FIG. 14a is a plan view of a cover member-equipped airbag (a folded form thereof) of such a configuration. FIG. 14b is a plan view illustrating the airbag in the flatly spread state. FIG. 14c is an exploded perspective view illustrating the procedure of attaching the cover member to the folded form of the airbag.

As illustrated in FIG. 14b, the width in the anteroposterior direction (The anteroposterior direction corresponds to the anteroposterior direction in the setting of the airbag to the seat pan or the retainer (illustration thereof omitted). Hereinafter, the same is true of the lateral direction.) of the airbag 312 of the present embodiment in the flatly spread state is relatively large. In the normal state (the inactive state of the occupant restraint device), the airbag 312 is folded to have a reduced anteroposterior width, and is placed on the seat pan or the retainer, being covered (shape-retained) by the cover member 318.

As illustrated in FIG. 14b, in the present embodiment, a pair of connecting portions 312a and 312a are formed to project backward from the left end and the right end of the rear edge of the airbag 312, respectively. The reference numeral 312b denotes a bolt insertion hole provided in each of the connecting portions 312a.

In the present embodiment, the airbag 312 is folded a plurality of times in a zigzag manner along fold lines $L_1$ and $L_2$ from an intermediate portion in the anteroposterior direction of the airbag 312. Thereby, the airbag 312 is folded into a folded form having the reduced anteroposterior width. The method of folding the airbag 312, however, is not limited to the above. For example, the airbag 312 may be folded so as to be wound in a roll from the front end to the rear end or from the rear end to the front end thereof. Further, the airbag 312 may be folded by the combined use of the zigzag folding and the roll folding. Needless to day, a folding method other than the above may be used. The airbag 312 may be folded to also have a reduced lateral width.

As illustrated in FIG. 14c, the cover member 318 is a cylindrical member having a size (a length) covering substantially the entirety of the outer circumference of the folded form of the airbag 312 from one end to the other end in the longitudinal direction of the folded form. The rear surface of the opposite end portions of the cover member 318 is formed with cut-out portions 318a and 318a for allowing the connecting portions 312a and 312a on the opposite ends of the airbag 312 to respectively project outside the cover member 318.

In the present embodiment, a connecting portion 318b is formed to project forward from the front surface of the cover member 318 to connect the cover member 318 to the seat pan or the retainer. The reference numeral 318c denotes a bolt insertion hole provided in the connecting portion 318b. The connecting portion 318b is disposed so as to be located at a position displaced by a predetermined distance from the center line $C_2$, which passes through the center in the lateral direction of the folded form and extends in the anteroposterior direction, toward one end (the right end in the present embodiment) in the longitudinal direction of the folded form, when the cover member 318 is attached to the folded form of the airbag 312.

The cover member 318 is configured to have a size fitting the outer circumference of the folded form of the airbag 312 in the uninflated state of the airbag 312, but to expand in the circumferential direction in accordance with the inflation of the airbag 312 in the inflation of the airbag 312.

In the present embodiment, the two connecting portions 312a and 312a of the airbag 312 projecting backward from the opposite ends of the cover member 318 and the connecting portion 318b provided to the front surface of the cover member 318 are respectively fastened to the seat pan or the retainer by bolts (illustration omitted). Thereby, the airbag 312 is fixed.

Although not illustrated, a gas generator is disposed inside the airbag 312 also in the present embodiment, similarly as in the foregoing embodiment of FIGS. 1 to 6. The gas generator is similar in installation structure to the gas generator of the embodiment of FIGS. 1 to 6. The gas generator, however, may be disposed outside the airbag 312 and connected to the airbag 312 via a duct or the like, as in the embodiment of FIGS. 10 and 11.

In the present embodiment, too, the respective connecting portions 312a, 312a and 318b are provided to the front edge side and the rear edge side of the airbag 312 (the folded form thereof), and are disposed at the positions displaced toward the left side and the right side from the center line $C_2$, which passes through the center in the lateral direction of the airbag 312 and extends in the anteroposterior direction. Thus, the connecting portions 312a, 312a, and 318b can be fastened to the seat pan or the retainer with no difficulty, even if there is a structure directly under the center line $C_2$ and a center line (illustration omitted) which passes through the center in the anteroposterior direction of the airbag 312 and extends in the lateral direction.

In the present embodiment, the connecting portions 312a, 312a, and 318b connected to the seat pan or the retainer are provided to the opposite sides of the front side and the rear side of the airbag 312 equipped with the cover member 318. Thus, the entirety of the airbag 312 equipped with the cover member 318 is firmly fixed to the seat pan or the retainer. Meanwhile, the front end side of the airbag 312 inside the cover member 318 is unfixed. Accordingly, the airbag 312 can relatively smoothly inflate upward, without being excessively restrained by the seat pan or the retainer.

In the above-described embodiment, the connecting portion connected to the seat pan or the retainer is provided to both the airbag 312 and the cover member 318. The embodiment, however, may be configured such that only the cover member is provided with the connecting portion connected to the seat pan or the retainer so as to cause the cover member to retain the airbag. In such a case, too, the entirety of the airbag equipped with the cover member is firmly fixed to the seat pan or the retainer, while the airbag inside the cover member is unfixed. Thus, the airbag can relatively smoothly inflate upward, without being excessively restrained by the seat pan or the retainer.

The respective embodiments described above are examples of the present invention. Thus, the present invention is not limited to the respective embodiments. It is obvious to a person skilled in the art that various modifications can be made without departing from the spirit and scope of the present invention.

The present application is based on Japanese Patent Application (Japanese Patent Application No. 2005-314861) filed on Oct. 28, 2005, the entire contents of which are incorporated herein by reference.

The invention claimed is:

1. An occupant restraint device comprising:
an airbag inflatable to push a seat cushion from beneath,
a gas generator for inflating the airbag, and
connecting portions which are formed at a marginal rear edge of the airbag, which are not located inside the airbag, and which do not inflate, said connecting portions being displaced from center lines in an anteroposterior direction and a lateral direction of the airbag so that the airbag is connected to a seat pan or an airbag container provided to the seat pan through the connecting portions;
wherein a bolt projects from the gas generator and pierces through the airbag and the seat pan or the container; the airbag and the gas generator are connected to the seat pan or the container, with a nut screwed on the bolt; and the bolt is disposed at a position displaced from the center lines of the airbag in the anteroposterior direction and the lateral direction.

2. The occupant restraint device according to claim 1, further comprising a front connecting portion disposed on a front portion of the airbag.

3. The occupant restraint device according to claim 2, wherein the front connecting portion is disposed at a front marginal edge of the airbag relative to one side of the anteroposterior direction center line, is not located inside the airbag and does not inflate.

4. The occupant restraint device according to claim 1, wherein the gas generator is disposed outside the airbag and is connected to the airbag through a duct.

5. An occupant restraint device comprising:
an airbag inflatable to push a seat cushion from beneath,
a gas generator for inflating the airbag, and
connecting portions which are formed at a marginal rear edge of the airbag, which are not located inside the airbag, and which do not inflate, said connecting portions being displaced from center lines in an anteroposterior direction and a lateral direction of the airbag so that the airbag is connected to a seat pan or an airbag container provided to the seat pan through the connecting portions,
wherein the gas generator is retained by a retainer; a bolt projects from the retainer and pierces through the airbag and the seat pan or the container; the airbag and the gas generator are connected to the seat pan or the container, with a nut screwed on the bolt; and the bolt is disposed at a position displaced from the center lines of the airbag in the anteroposterior direction and the lateral direction.

6. An occupant restraint device comprising:
an airbag inflatable to push a seat cushion from beneath,
a gas generator for inflating the airbag, and
connecting portions which are formed at a marginal rear edge of the airbag, which are not located inside the airbag, and which do not inflate, said connecting portions being displaced from center lines in an anteroposterior direction and a lateral direction of the airbag so that the airbag is connected to a seat pan or an airbag container provided to the seat pan through the connecting portions;
wherein the airbag is folded at least proximate a front edge and a cover member is provided to at least partially cover an outer circumference of the airbag; the cover member is connected to the seat pan or the container; and a connecting portion of the cover member connected to the seat pan or the container is disposed at a position displaced from the center lines in the anteroposterior direction and the lateral direction of the airbag.

7. The occupant restraint device according to claim 6, wherein the cover member is formed by a cloth wrapping an entirety of a folded form of the airbag.

8. The occupant restraint device according to claim 7, wherein a circumferential length of the cover member is set to be shorter than a circumferential length of the airbag in an inflated state.

9. An occupant restraint device comprising:
an airbag inflatable to push a seat cushion from beneath,
a cover member for at least partially covering an outer circumference of the airbag,
a gas generator for inflating the airbag, and
connecting portions formed so as to each project from a side of the cover member, said connecting portions being connected to a seat pan or a container and being disposed at a position displaced from center lines in an anteroposterior direction and a lateral direction of the airbag;
wherein the connecting portions comprise a first connection portion which is located on a first side of the anteroposterior direction center line and which extends essentially parallel to and forward of the lateral direction center line, and a second connection portion which is located on a second side of the anteroposterior direction center line and which extends essentially parallel to and aft of the lateral direction section line.

10. The occupant restraint device according to claim 9, wherein the cover member is formed by a cloth wrapping an entirety of a folded form of the airbag.

11. The occupant restraint device according to claim 10, wherein a circumferential length of the cover member is set to be shorter than a circumferential length of the airbag in an inflated state.

12. The occupant restraint device according to claim 9, wherein the gas generator is disposed outside the airbag and is connected to the airbag through a duct.

13. The occupant restraint device according to claim 9, wherein a third connection portion is located on a forward marginal edge of the air bag and located on a first side of the anteroposterior direction center line and forward of the lateral direction center line and such as to extend essentially normal to the lateral direction center line.

14. An occupant restraint device comprising:
an airbag inflatable to push a seat cushion from beneath,
a gas generator for inflating the airbag, and
connecting portions which are formed at a marginal rear edge of the airbag, which are not located inside the airbag, and which do not inflate, said connecting portions being displaced from center lines in an anteroposterior direction and a lateral direction of the airbag so that the airbag is connected to a seat pan or an airbag container provided to the seat pan through the connecting portions;
wherein the gas generator is disposed in the airbag and the connecting portions are distal from the gas generator.

15. An occupant restraint device comprising:
an airbag inflatable to push a seat cushion from beneath,
a gas generator for inflating the airbag, and
connecting portions which are formed at a marginal rear edge of the airbag, which are not located inside the airbag, and which do not inflate, said connecting portions being displaced from center lines in an anteroposterior direction and a lateral direction of the airbag so that the airbag is connected to a seat pan or an airbag container provided to the seat pan through the connecting portions, and
a front connecting portion disposed on a front portion of the airbag,
wherein the gas generator is disposed in the airbag and the front connecting portion is proximate the gas generator.

* * * * *